(12) United States Patent
Hacikyan et al.

(10) Patent No.: US 11,028,292 B2
(45) Date of Patent: Jun. 8, 2021

(54) HEAT-RESISTANT WELD BACKING TAPE FOR HIGH ENERGY APPLICATIONS

(71) Applicant: Michael Hacikyan, North Tonawanda, NY (US)

(72) Inventors: Michael Hacikyan, Naples, FL (US); Graeme S. Barritte, Lockport, NY (US)

(73) Assignee: Michael Hacikyan, Naples, FL (US)

( * ) Notice: Subject to any disclaimer, the term of this patent is extended or adjusted under 35 U.S.C. 154(b) by 157 days.

(21) Appl. No.: 16/246,709

(22) Filed: Jan. 14, 2019

(65) Prior Publication Data

US 2020/0224065 A1    Jul. 16, 2020

(51) Int. Cl.
*B23K 9/00* (2006.01)
*C09J 9/00* (2006.01)
(Continued)

(52) U.S. Cl.
CPC ........... *C09J 9/00* (2013.01); *B23K 9/0356* (2013.01); *B32B 5/024* (2013.01); *B32B 7/06* (2013.01);
(Continued)

(58) Field of Classification Search
CPC ....... C09J 9/00; C09J 7/385; C09J 7/28; C09J 5/10; C09J 2400/163; C09J 2433/00;
(Continued)

(56) References Cited

U.S. PATENT DOCUMENTS

| 2,820,427 A | * | 1/1958 | Chyle | .......... B23K 9/035 228/50 |
| 2,916,001 A | * | 12/1959 | Chyle | .......... B23K 35/0255 228/216 |

(Continued)

FOREIGN PATENT DOCUMENTS

| GB | 817699 A | * | 8/1959 | ............ B23K 9/035 |
| GB | 1132908 A | * | 11/1968 | ............ B23K 9/035 |
| JP | 01228675 | | 9/1989 | |

OTHER PUBLICATIONS

Aquasol Corporation, "Fiback Fiberglass Weld Backing Tape", at least as early as Jan. 11, 2019, 2 pages.
(Continued)

*Primary Examiner* — Kiley S Stoner
(74) *Attorney, Agent, or Firm* — Walter W. Duft

(57) ABSTRACT

A heat-resistant weld backing tape for placement between a backing member and a workpiece to be welded at a root gap. The weld backing tape includes a flexible tape substrate. The tape substrate has a longitudinal length that extends between first and second tape substrate ends, and a lateral width that extends between first and second tape substrate side edges. The tape substrate has a substantially planar first face and a substantially planar second face. The first and second tape substrate faces are mutually parallel and spaced from each other by a tape substrate thickness. The tape substrate length and the tape substrate width are substantially larger than the tape substrate thickness. A heat-resistant material is disposed on the first tape substrate face and arranged to face the
(Continued)

workpiece during welding. An adhesive material is disposed on the second tape substrate face and arranged to face the backing member during welding.

14 Claims, 2 Drawing Sheets

(51) Int. Cl.
| | |
|---|---|
| C09J 7/38 | (2018.01) |
| C09J 7/28 | (2018.01) |
| C09J 5/10 | (2006.01) |
| B32B 7/12 | (2006.01) |
| B32B 7/06 | (2019.01) |
| B32B 15/14 | (2006.01) |
| B32B 15/20 | (2006.01) |
| B32B 5/02 | (2006.01) |
| B23K 9/035 | (2006.01) |

(52) U.S. Cl.
CPC ............. *B32B 7/12* (2013.01); *B32B 15/14* (2013.01); *B32B 15/20* (2013.01); *C09J 5/10* (2013.01); *C09J 7/28* (2018.01); *C09J 7/385* (2018.01); *B32B 2262/101* (2013.01); *B32B 2307/306* (2013.01); *C09J 2400/14* (2013.01); *C09J 2400/163* (2013.01); *C09J 2433/00* (2013.01)

(58) Field of Classification Search
CPC ......... C09J 2400/14; B32B 7/12; B32B 7/06; B32B 15/14; B32B 15/20; B32B 5/024; B32B 2262/101; B32B 2307/306; B32B 1/00; B23K 3/087; B23K 9/035–0358
USPC .................................................. 228/50, 59
See application file for complete search history.

(56) References Cited

U.S. PATENT DOCUMENTS

| | | | |
|---|---|---|---|
| 3,001,057 A | 9/1961 | Hackman | |
| 3,365,566 A * | 1/1968 | Kuder | B23K 9/0356 219/160 |
| 3,372,852 A * | 3/1968 | Cornell | B23K 35/0255 228/42 |
| 3,494,020 A * | 2/1970 | Cornell | C09J 7/28 228/216 |
| 3,589,951 A * | 6/1971 | Arikawa et al. | B23K 35/0255 148/24 |
| 3,603,011 A * | 9/1971 | Cohen | D06F 83/00 38/66 |
| 3,662,144 A * | 5/1972 | De Haeck | B23K 35/362 219/73 |
| 3,669,335 A * | 6/1972 | Arikawa | B23K 9/035 228/50 |
| 3,721,797 A * | 3/1973 | Arikawa et al. | B23K 9/035 428/557 |
| 3,777,114 A * | 12/1973 | Reynolds | B23K 9/035 219/160 |
| 3,866,284 A * | 2/1975 | Arikawa | B23K 9/035 219/137 R |
| 3,929,270 A * | 12/1975 | Keith | B23K 9/0356 228/50 |
| 3,972,466 A * | 8/1976 | Keith | B23K 9/0356 228/216 |
| 4,049,183 A * | 9/1977 | Roden | B23K 9/0356 228/50 |
| 4,150,775 A * | 4/1979 | Roden | B23K 35/0255 156/191 |
| 4,182,951 A * | 1/1980 | Kuder | B23K 9/0356 219/160 |
| 4,295,593 A * | 10/1981 | Kensrue | B23K 9/035 219/160 |
| 4,344,556 A * | 8/1982 | Knapp | B23K 9/0356 228/50 |
| 4,459,062 A * | 7/1984 | Siebert | C23C 4/00 403/271 |
| 4,510,171 A * | 4/1985 | Siebert | B23K 9/23 228/165 |
| 4,759,981 A * | 7/1988 | Weil | B23K 9/0356 219/160 |
| 4,818,629 A * | 4/1989 | Jenstrom | B23K 9/23 228/165 |
| 5,451,741 A * | 9/1995 | Doronin | B23K 9/035 219/160 |
| 7,690,549 B1 * | 4/2010 | Owensby | B23K 9/32 228/42 |
| 2002/0125295 A1 * | 9/2002 | Mudge, Jr. | B23K 37/06 228/50 |
| 2005/0045694 A1 * | 3/2005 | Subramanian | B23K 37/06 228/112.1 |
| 2006/0068142 A1 * | 3/2006 | Hacikyan | B23K 9/326 428/40.1 |
| 2013/0270246 A1 * | 10/2013 | Okazaki | B23K 35/0261 219/137 WM |
| 2015/0197061 A1 * | 7/2015 | Wang | G05B 15/02 700/98 |
| 2016/0167179 A1 * | 6/2016 | Wang | B23K 37/06 403/270 |
| 2016/0288234 A1 * | 10/2016 | Adcock | B23K 9/0356 |
| 2018/0318960 A1 * | 11/2018 | Gambarotta | B23K 23/00 |
| 2020/0239741 A1 * | 7/2020 | Hacikyan | B23K 9/035 |

OTHER PUBLICATIONS

Aquasol Corporation, "Fiback Technical Manual", at least as early as Dec. 7, 2018, 8 pages.

\* cited by examiner

HEAT-RESISTANT WELD BACKING TAPE FOR HIGH ENERGY APPLICATIONS

BACKGROUND

1. Field

The present disclosure relates generally to welding. More particularly, the invention is directed to heat-resistant weld backing tape for high-energy applications.

2. Description of the Prior Art

By way of background, heat resistant backing tape has been used for single-sided manual TIG and MIG applications for many years at relatively low energy input levels. Existing weld backing tape products for low energy welding processes typically include a thin, flexible metallic tape substrate (e.g., made from an aluminum or copper alloy) having a layer of adhesive material covering one face of the substrate. A strip of non-metallic heat-resistant material, such as woven fiberglass, is centrally disposed on the adhesive. The exposed portions of the adhesive that lie on each side of the heat-resistant strip are used to adhere the weld backing tape to the underside of a workpiece, with the heat-resistant strip backing the root gap that separates the two workpiece structures to be welded.

Higher energy single-sided welding processes often use other forms of weld backing in lieu of weld backing tape. By way of example, for some single-sided higher energy processes, the weld backing consists of a strip of heat-resistant fiberglass material (with no tape substrate or adhesive) inserted as an interface between a steel workpiece and a copper backing member in so called "seamer applications" where the parent steel of the workpiece is clamped in position onto the backing member. During welding, the fiberglass strip acts to protect the copper backing member and is partly consumed by the process. For other single-sided higher energy processes, the workpiece is backed solely by a thin steel backing member that is fused into the weld root area and becomes a permanent feature of the final structure.

Some workpieces have configurations for which it is not advantageous to use either of the above-described backing methods designed for high-energy processes. Examples include elongated tubes and other hollow walled structures in which high-energy welding is performed on the outside of the structure and the backing member needs to be introduced inside the structure. The technique that interposes a fiberglass strip between the workpiece and a copper backing member is impractical because of the difficulty of maintaining the strip in place as the backing member is introduced into the interior of the structure and clamped in position. The technique that uses a steel backing member that becomes fused to the workpiece is impractical if the fused backing member blocks a second structure that needs to be introduced within the interior of the first structure, such as in a telescopic arrangement of first and second tubular structures.

Applicant submits that there is presently a need for a solution that facilitates high-energy welding without the attendant disadvantages of the processes described above.

SUMMARY

In one aspect of the present disclosure, a heat-resistant weld backing tape is provided for placement between a backing member and a workpiece that includes a pair of structures to be welded together at a root gap. The weld backing tape includes a flexible tape substrate. The tape substrate has a longitudinal length that extends between first and second tape substrate ends, and a lateral width that extends between first and second tape substrate side edges. The tape substrate has a substantially planar first face and a substantially planar second face. Each tape substrate face is bounded in a longitudinal direction by the first and second tape substrate ends and in a lateral direction by the first and second tape substrate side edges. The first and second tape substrate faces are mutually parallel and spaced from each other by a tape substrate thickness. The tape substrate length and the tape substrate width are substantially larger than the tape substrate thickness. A heat-resistant material is disposed on the first tape substrate face and arranged to face toward the workpiece during welding. An adhesive material is disposed on the second tape substrate face and arranged to face toward the backing member during welding.

In an embodiment, the tape substrate comprises a flexible metallic material.

In an embodiment, the heat-resistant material comprises a flexible non-metallic material.

In an embodiment, the heat-resistant material comprises a non-metallic fibrous material.

In an embodiment, the heat-resistant material comprises a woven fiberglass strip that is attached to the tape substrate by way of stitching.

In an embodiment, the heat-resistant material comprises a root gap area arranged to span a welding root gap of a workpiece to be welded, and wherein the adhesive material is laterally offset from the root gap area.

In an embodiment, the heat-resistant material comprises first and second side edges on either side of the root gap area, the adhesive material is disposed at first and second adhesive-bearing regions of the second tape substrate face, the first adhesive region is located between the first side edge of the heat-resistant material and the first tape substrate side edge, and the second adhesive region being located between the second side edge of the heat-resistant material and the second tape substrate side edge.

In another aspect, a welding assembly is provided that includes a heat-resistant weld backing tape as summarized above installed between a backing member and a workpiece that includes a pair of structures to be welded together at a root gap.

In a further aspect, a welding method is provided that includes installing a heat-resistant weld backing tape as summarized above between a backing member and a workpiece that includes a pair of structures to be welded together at a root gap, performing welding, and removing the backing member along with any residual portion of the weld backing tape that remains adhered to the backing member.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 1:
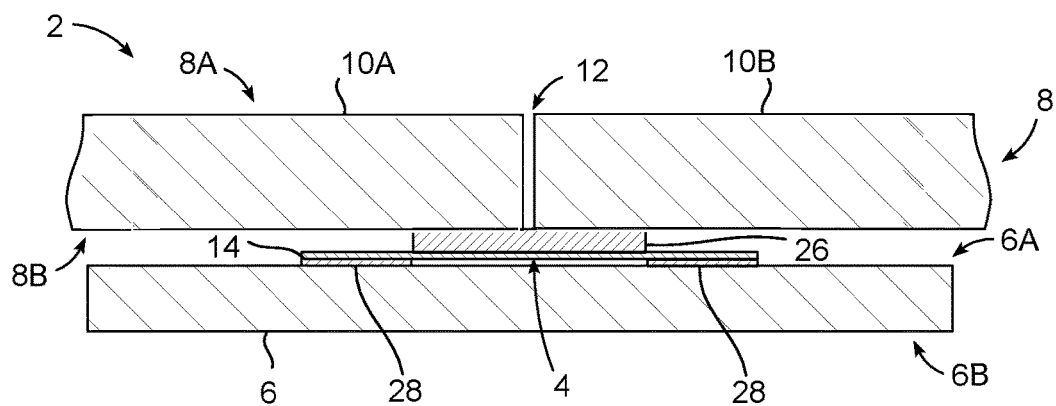
FIG. 1 is a cross-sectional view of a welding assembly that includes a heat-resistant weld backing tape in accordance with an embodiment of the present disclosure.

Turning now to the drawing figures, which are not necessarily to scale, like reference numbers are used to represent like elements in all of the several views. FIG. 1 illustrates a weld assembly 2 that includes a heat-resistant weld backing tape 4 placed between a backing member 6 and a workpiece 8. As shown, the workpiece 8 may constitute a pair of structures 10A and 10B to be welded together at a welding root gap 12. In an embodiment, the backing member 6 may be implemented as a structural backing plate or bar having a first side 6A and a second side 6B. The backing member 6 can be made of copper, mild steel or other suitable weld-backing materials. In an embodiment, the workpiece 8 has a first side 8A and a second side 8B opposite from the first side. The individual workpiece structures 10A and 10B may be structural sheets, plates, walls, etc., made of aluminum, carbon steel, chrome steels, stainless steel, duplex stainless steels, cast iron, nickel and cobalt alloys, copper nickel, or other weldable materials. The workpiece structures 10A and 10B may have either the same or different thicknesses. In an embodiment, the workpiece structures 10A and 10B could form the walls of a hollow workpiece 8, such as an elongated tube or pipe, a square section, a rectangular section, or other hollow structure. In that case, the first workpiece side 8A could define an outside surface of the structure that is substantially accessible for welding and the second workpiece side 8B could define an inside surface of the structure that is relatively inaccessible (as compared to the the outside surface) due to being disposed within the structure's hollow interior.

In the illustrated embodiment, the weld assembly 2 is set up for single-sided high-energy welding. Generally speaking, high-energy welding is typically performed at energy levels ranging between approximately 1.5 kJ/mm to 2.5 kJ/mm. In contrast, low-energy welding is typically performed at energy levels ranging between approximately 0.5 kJ/mm to 1.5 kJ/mm. Although FIG. 1 depicts the workpiece structures 10A and 10B having substantially parallel edges arranged in a square groove butt joint configuration at the root gap 12, it will be appreciated that other weld joint configurations could also be used. Non-limiting examples include an overlapping angled butt joint, a single-bevel butt joint, a single-V butt joint, a single-U butt joint, a single-J butt joint, etc. Although not shown, the backing member 6 may be clamped to the parent steel of the workpiece 8 in a so-called "seamer" configuration, with the first side 6A of the backing member 6 facing the second side 8B of the workpiece 8, and with the weld backing tape 4 sandwiched therebetween.

Figure 2:
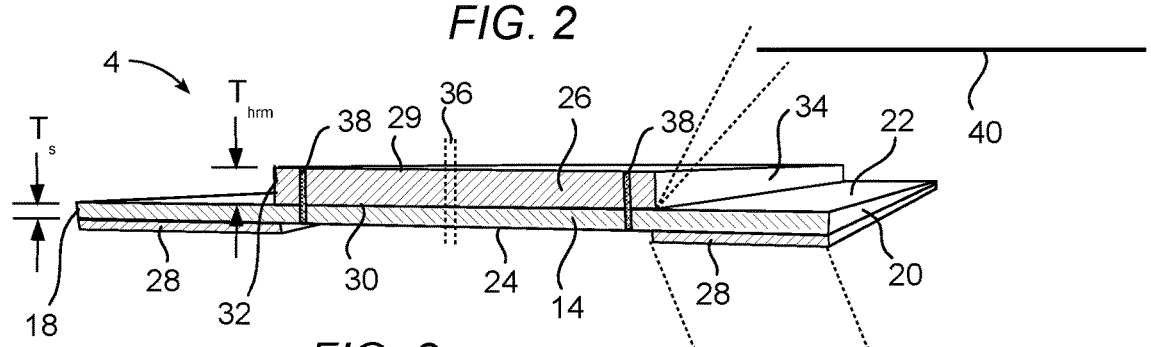
FIG. 2 is a cross-sectional top perspective view of the weld backing tape shown in FIG. 1.
Figure 3:
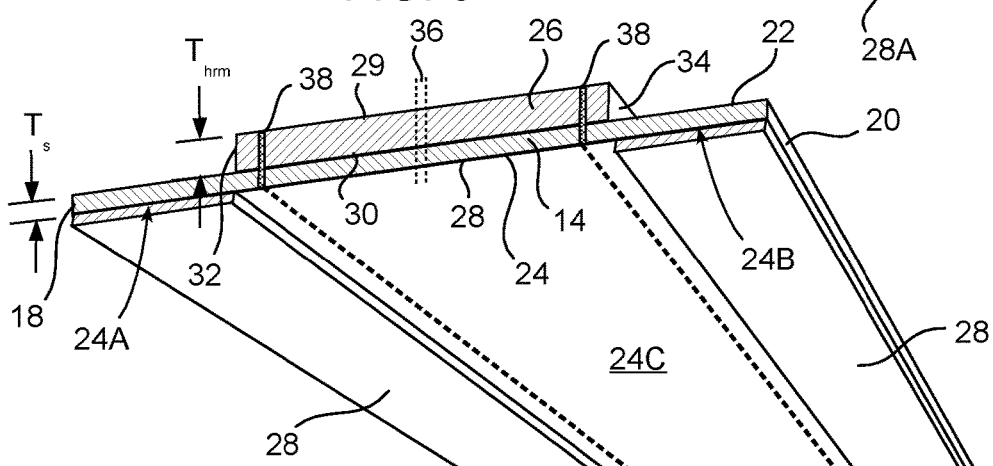
FIG. 3 is a cross-sectional bottom perspective view of the weld backing tape shown in FIG. 1.

With additional reference to FIGS. 2 and 3, the weld backing tape 4 includes a thin and flexible tape substrate 14 that may be constructed from a suitable metallic sheet material, such as a foil made from an aluminum or copper alloy having a thickness ranging between approximately 0.075-0.25 mm (e.g., 3-9 mils). The tape substrate 14 may be constructed as a single-layer solid body consisting solely and entirely of one metallic material. Alternatively, the tape substrate 14 could be constructed as a multi-layer (laminate) solid body consisting of two or more layers of one metallic material, different metallic materials, or possibly a combination of metallic and non-metallic materials.

Figure 4:
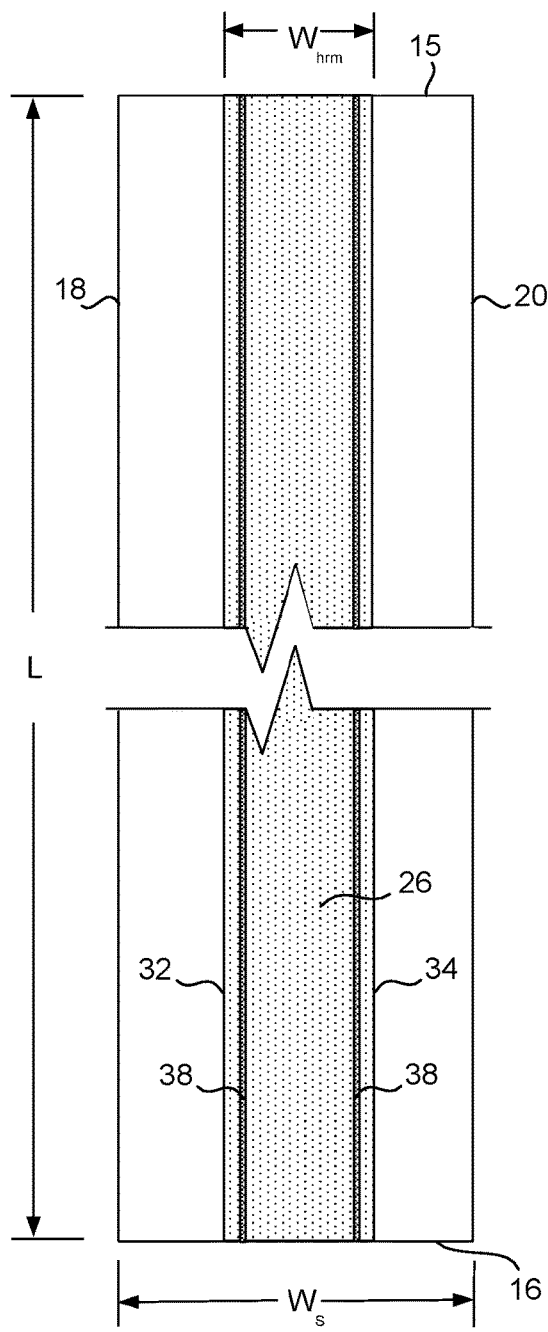
FIG. 4 is a fragmentary top plan view of the weld backing tape shown in FIG. 1.
Figure 5:
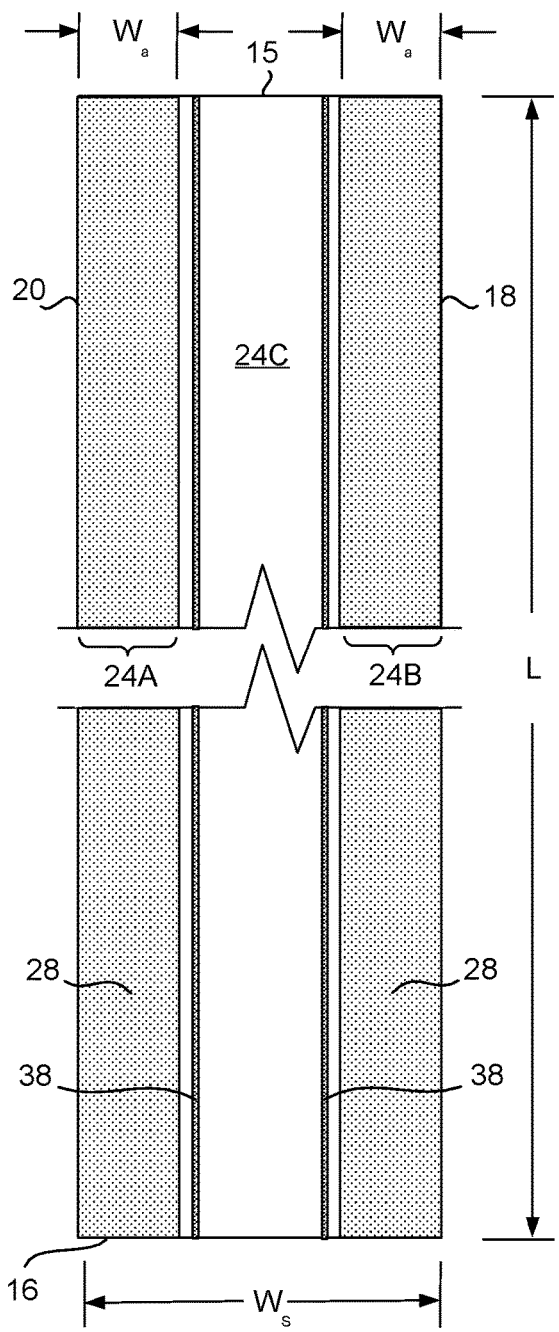
FIG. 5 is a fragmentary bottom plan view of the weld backing tape shown in FIG. 1.

With further reference to FIGS. 4-5, the tape substrate 14 has a longitudinal length L that extends between a first tape substrate end 15 and second tape substrate end 16. As also shown in FIGS. 4 and 5, the tape substrate 14 has a substantially uniform lateral width $W_s$ that extends between a first tape substrate side edge 18 and second tape substrate side edge 20. As best shown in FIGS. 2 and 3, the tape substrate 14 has a substantially planar first face 22 and a substantially planar second face 24. Each tape substrate face 22 and 24 is bounded in a longitudinal direction by the first and second tape substrate ends 15/16 and in a lateral direction by the first and second tape substrate side edges 18/20. The first and second tape substrate faces 22 and 24 are separated from each other by a substantially uniform tape substrate thickness $T_s$. In an embodiment, the tape substrate 14 may have a substantially rectangular cross-section along its entire length L, the cross-section being defined by the tape substrate width $W_s$ and the tape substrate thickness $T_s$.

In an embodiment, the tape substrate length L and the tape substrate width $W_s$ are substantially larger than the tape substrate thickness $T_s$. For example, the tape substrate thickness $T_s$ may be approximately 0.075-0.25 mm (e.g., 3-9 mils) for many welding applications, whereas the tape substrate length L may be approximately 12.5 meters (e.g., 41 feet) or 25 meters (e.g., 82 feet) and the tape substrate width $W_s$ may be approximately 64 mm (e.g., 2.5 inches) or 102 mm (e.g., 4.0 inches). It will be appreciated that other length, width and thickness dimensions could be used for the tape substrate 14, depending on the size of the workpiece 8, the size of the backing member 6, the length of the root gap 12, or other factors.

In the illustrated embodiment, a heat-resistant material 26 is disposed on the first tape substrate face 22, and an adhesive material 28 is disposed on the second tape substrate face 24. During welding, the first tape substrate face 22 (with the heat-resistant material 26 thereon) is arranged to face toward the workpiece 8, and the second tape substrate face 24 (with the adhesive material 28 thereon) is arranged to face toward the backing member 6. The purpose of the heat-resistant material 26 is to provide a heat-resistant backing for the root gap 12 that substantially contains the weld pool and helps isolate the back side of the root gap from atmospheric contaminants. The purpose of the adhesive material 28 is to removably adhere the weld backing tape 4 to the first side 6A of the backing member 6.

The heat-resistant material 26 may be provided by a flexible non-metallic material, such as a non-metallic fibrous material. For example, the heat-resistant material 26 may be a tightly and finely woven, unadulterated fiberglass strip. As best shown in FIGS. 2 and 3), the heat-resistant material 26 may have a first material face 29 arranged for interfacial contact with the second side 8B of the workpiece 8, and a second material face 30 arranged for interfacial contact with the first tape substrate face 22. The heat-resistant material 26 may have mutually parallel first and second longitudinal side edges 32 and 34 disposed on either side of a central root gap area 36 of the heat-resistant material that is arranged to span the root gap 12. The width of the root gap area 36 corresponds to the width of the root gap 12. The heat-resistant material 26 may be constructed as a single-layer body consisting solely and entirely of one heat-resistant material. Alternatively, the heat-resistant material 26 could be constructed as a multi-layer (laminate) body consisting of two or more layers of one heat-resistant material or different heat-resistant materials.

As shown in FIGS. 2-5, the heat-resistant material 26 may be centrally disposed on the first tape substrate face 22, i.e., substantially midway between the tape substrate side edges 18 and 20. In this configuration, the spacing between the first side edge 32 of the heat-resistant material 26 and the first tape substrate side edge 18 will be substantially equal to the spacing between the second side edge 34 of the heat-resistant material and the second tape substrate side edge 20. Non-centered offset positioning of the heat-resistant material 26 also be implemented. In a lengthwise direction, the heat-resistant material 26 may extend longitudinally from the first tape substrate end 15 to the second tape substrate end 16. For example, the heat-resistant material 26 could be provided as a single heat-resistant strip whose length corresponds to the length L of the tape substrate 14. Alternatively, the heat-resistant material 26 could be provided as a series of heat-resistant strips arranged contiguously (or non-contiguously) end-to-end along the length L of the tape substrate 14.

In a widthwise direction, the heat-resistant material 26 may have a substantially uniform heat-resistant material width $W_{hrm}$ that spans as much of the tape substrate width $W_s$ as may be required to serve the intended purpose of the heat-resistant material (as discussed above). For example the heat-resistant material width $W_{hrm}$ may be selected according the width of the root gap 12, the power level of the intended welding application, the heat-resistant material being used, or other factors. For many welding applications, a heat-resistant material width $W_{hrm}$ of at least approximately 25 mm (1 inch) will be sufficient. For example, different embodiments of the weld backing tape 4 could respectively utilize small and large heat-resistant material widths $W_{hrm}$ of approximately 28.5 mm (e.g., 1.125 inches) and approximately 38 mm (e.g., 1.5 inches). In the illustrated embodiment, the heat-resistant material 26 may have a substantially rectangular cross section defined by the substantially uniform heat-resistant material width $W_{hrm}$ and a substantially uniform heat-resistant material thickness $T_{hrm}$. Like the heat-resistant material width $W_{hrm}$, the heat-resistant material thickness $T_{hrm}$ may also be selected according to factors such as the width of the root gap 12, the power level of the intended welding application, the heat-resistant material being used, etc. For many welding applications, a heat-resistant material thickness $T_{hrm}$ of less than approximately 5 mm (200 mils) will be sufficient. For example, different embodiments of the weld backing tape 4 could respectively utilize small and large heat-resistant material thicknesses $T_{hrm}$ of approximately 1 mm (e.g., 40 mils) and approximately 3 mm (e.g., 120 mils).

As shown in FIGS. 2-5, the heat-resistant material 26 may be attached to the tape substrate 14 by way of mechanical fastening in the form of machine stitching 38. Any suitably heat-resistant stitching material, such as fire-retardant sewing thread made from nylon or the like, may be used. In an embodiment, two rows of stitching 38 may be provided. The rows of stitching 38 may be respectively disposed proximate to the first and second side edges 32 and 34 of the heat-resistant material 26. Depending on the width $W_{hrm}$ of the heat-resistant material 26, one or more additional rows of stitching 38 could also be provided, such as at the central root gap area 36 of the heat-resistant material. In an embodiment, other attachment techniques such as adhesive bonding or other forms of mechanical fastening could be used in lieu of stitching to attach the heat-resistant material 26 to the tape substrate 14.

In the illustrated embodiment, the heat-resistant material 26 is affixed directly onto the tape substrate 14, with the second face 30 of the heat-resistant material being in interfacial contact with the first tape substrate face 22. However, it will be appreciated that one or more layers of another heat resistant material could be interposed, such that the engagement between the heat-resistant material 26 and the tape substrate 14 is indirect, By way of example, the other heat-resistant material could provided by one or more layers of ceramic paper. This is illustrated by reference number 40 in FIG. 2.

The adhesive material 28 may be provided as one or more regions of applied heat-resistant adhesive, such as a halogen-free acrylic base adhesive of the type used in existing welding tape products. In an embodiment, the adhesive material 28 may be laterally offset from the root gap area 36 of the heat-resistant material 26. This offset placement of the adhesive material 28 spaces it away from the high heat area of the root gap 12 where active welding occurs. That said, the adhesive material 28 could span the entire width $W_s$ of the tape substrate 14 if so desired.

FIGS. 2-3 illustrate an embodiment wherein the adhesive material 28 is disposed to cover first and second adhesive-bearing regions 24A and 24B of the second tape substrate face 24. In a lengthwise direction, each adhesive-bearing region 24A and 24B may extend continuously longitudinally from the first tape substrate end 15 to the second tape substrate end 16. Alternatively, each adhesive-bearing region 24A and 24B could be extend longitudinally in intermittent (or non-intermittent) fashion as a series of discrete adhesive bearing regions disposed between the first tape substrate end 15 and the second tape substrate end 16.

In a width-wise direction, the first adhesive-bearing region 24A may span some or all of the area of the second substrate face 24 that lies between the first side edge 32 of the heat-resistant material 26 and the first tape substrate side edge 18. The second adhesive-bearing region 24B may span some or all of the area of the second substrate face 24 that lies between the second side edge 34 of the heat-resistant material and the second tape substrate side edge 20. In the illustrated embodiment, the adhesive-bearing regions 24A/24B fill the areas of the second substrate face 24 that lie outside the side edges 32/34 of the heat-resistant material 26. This is shown in FIG. 5, which depicts the adhesive-bearing regions 24A and 24B as each having an applied adhesive material of width $W_a$ thereon. In this embodiment, the collective width $W_a$ of the adhesive-bearing regions 24A and 24B represents the amount by which the tape substrate width $W_s$ exceeds the heat-resistant material width $W_{hrm}$. For example, if the tape substrate width $W_{hrm}$ is at least approximately 60 mm (2.4 inches) and the heat-resistant material width $W_{hrm}$ is approximately 25 mm (1 inch), the collective width $W_a$ of the first and second adhesive-bearing regions 24A and 24B will be at least approximately 35 mm (1.4 inches), with the individual width $W_a$ of each adhesive bearing region being 17.5 mm (0.7 inches). For most welding applications, this amount of adhesive material 28 should be sufficient to ensure that the weld backing tape 4 adequately adheres to the backing member 6.

In an alternate embodiment, the inside edges of the first and second adhesive-bearing regions 24A and 24B could respectively extend inside the first and second side edges 32 and 34 of the heat-resistant material 26. In a further embodiment, the inside edges of the first and second adhesive-bearing regions 24A and 24B could respectively extend inside the first and second side edges 32 and 34 of the heat-resistant material 26, but outside the area of the stitching 38. In a still further embodiment, the inside edges of the first and second adhesive-bearing regions 24A and 24B could respectively terminate outside the first and second side edges 32 and 34 of the heat-resistant material 26.

As shown in FIGS. 3 and 5, an adhesive-free region 24C of the second tape substrate face 24, substantially devoid of the adhesive material 28, may lie between the first and second adhesive-bearing regions 24A and 24B. This configuration ensures there will be no adhesive material 28 in the hotter central region of the weld backing tape 4 that underlies the root gap 12. The temperatures in this hotter region of the weld backing tape 4 may be high enough to melt, burn or otherwise degrade the adhesive material 28, such that lateral placement of the adhesive material away from the hotter central region is preferred. As previously mentioned, however, the adhesive material 28 may span the entire width ($W_s$) of the second tape substrate face 24 if so desired, in which case there would be no adhesive-free region.

Conventional roll coating, spray coating or other techniques may be used to apply the adhesive adhesive material 28 to the second tape substrate face 24. Regardless of which adhesive application method is used, a suitable processing technique may be used to define the geometry of the adhesive-bearing regions 24A and 24B. Such processing may include the use of a single adhesive coating operation onto the second tape substrate face 24, with a central mask (not shown) placed over the area of the adhesive-free region 24C to induce adhesive coverage only in the adhesive-bearing regions 24A and 24B. Alternatively, the adhesive-bearing regions 24A and 24B could be created by way of separate spatially-controlled coatings of the adhesive material 28. A further alternative would be to attached pre-formed adhesive strips (e.g., with double-sided adhesive) to the second tape substrate face 24.

As shown in FIG. 2, peelable backing sheets (see reference number 28A) from from conventional adhesive backing material (such as paper) may be applied to cover the adhesive material 28 to protect it prior to installation of the weld backing tape 4 in the weld assembly 2. This will facilitate rolling of the weld backing tape 4 for convenient shipment, storage and handling by end users.

The welding assembly 2 of FIG. 1 may be created according to a welding method now to be described. Initially, the workpiece 8 is setup by providing the first and second workpiece structures 10A and 10B to be welded together, and arranging them in adjacent relationship to form the welding root gap 12 therebetween. A typical root gap width of between approximately 0-5 mm may be used. The backing member 6 and the weld backing tape 4 may then be prepared. In an embodiment, the backing member 6 and a suitable length of the weld backing tape 4 are provided for separate subassembly prior to final assembly with the workpiece 8.

Initially, any removable backing sheet 28A covering the adhesive material 28 is removed. The weld backing tape 4 may then be attached to the backing member by adhering the adhesive material 28 to the backing member first side 6A. The backing member 6, with the weld backing tape 4 adhered thereto, may now be placed in a desired installation position for clamping of the backing member 6 to the workpiece 8 in order to form the completed weld assembly 2. As previously noted, in the installation position, the first backing member side 6A will face the second side 8B of the workpiece 8, and the weld backing tape 4 will be disposed between the backing member and the workpiece.

As part of the final weld assembly formation procedure, the clamping member 6 is maneuvered relative to the workpiece 8 until the first material face 29 of the heat-resistant material 26 of the weld backing tape 4 is placed in interfacial contact with the second side 8B of the workpiece 8. Preferably, the root gap region 36 of the heat-resistant material 26 will be centered on the root gap 12. In this way, the heat-resistant material will have substantially equal contact with both the first and second workpiece structures 10A and 10B. The backing member 6 may then be clamped to the workpiece 8 using a conventional clamping arrangement (not shown) to complete the welding assembly 2.

With the welding assembly 2 securely formed, welding may be commenced to apply weld material into the root gap 12 from the first workpiece side 8A in order to form a weld seam between the first and second workpiece structures 10A and 10B. Once the welding operation has been completed, the backing member 6 may be unclamped from the workpiece 8 and removed. Advantageously, it will not be possible for the backing member 6 to fuse to the workpiece 8 due to the presence of the weld backing tape 4. Separation and removal of the backing member from the workpiece 8 should thus be effortless and problem-free.

In many cases, the weld backing tape 4 will remain intact and adhered to backing member 6 following welding. In that case, removal of the backing member 6 will also remove the weld backing tape 4 from the workpiece 8. In other cases, the intense heat generated by the welding operation may result in the weld backing tape 4 not remaining sufficiently adhered to the backing member 6 to allow its removal from the inside surface 8B of the workpiece 8. For example, the weld backing tape 4, or remnants thereof, may adhere to the workpiece 8. In that case, the weld backing tape 4 or the backing tape remnants may be left in place if so desired. Insofar as the weld backing tape 4 is relatively thin and flexible, leaving it in place against the workpiece 8 will generally not be problematic. In any event, this condition will be far less problematic than having to leave the backing member 6 fused to the workpiece 8, as has been done in the past for some higher energy processes.

Accordingly, a heat-resistant weld backing tape, together with a related weld assembly and a welding method, have been disclosed. While various embodiments have been described, it should be apparent that many variations and alternative embodiments could be implemented in accordance with the invention. It is understood, therefore, that an invention as disclosed herein is not to be in any way limited except in accordance with the spirit of the appended claims and their equivalents.

What is claimed is:

1. A welding assembly, comprising:

first and second workpiece structures to be welded together, the first and second workpiece structures being arranged in adjacent relationship to form a workpiece having a welding root gap between the workpiece structures;

the workpiece having a first side on which welding is to be performed and a second side opposite from the first side;

a rigid metal backing member facing the second side of the workpiece;

a heat-resistant weld backing tape disposed between the backing member and the second side of the workpiece;

the heat-resistant weld backing tape comprising:

a flexible metallic tape substrate arranged to cover the welding root gap;

the tape substrate having a longitudinal length that extends between first and second tape substrate ends;

the tape substrate having a lateral width that extends between first and second tape substrate side edges;

the tape substrate having a substantially planar first face facing the second side of the first and second structures and a substantially planar second face facing the backing member, each tape substrate face being bounded in a longitudinal direction by the first and second tape substrate ends and in a lateral direction by the first and second tape substrate side edges;

the first and second tape substrate faces being mutually parallel and spaced from each other by a tape substrate thickness;

the tape substrate length and the tape substrate width being substantially larger than the tape substrate thickness;

a heat-resistant material disposed on the first tape substrate face, the heat-resistant material being in interfacial contact with the second side of the workpiece; and an adhesive material disposed on the second tape substrate face, the adhesive material being adhered to the backing member.

2. The welding assembly of claim 1, wherein the tape substrate comprises a flexible metallic foil material.

3. The welding assembly of claim 1, wherein the heat-resistant material comprises a flexible non-metallic material.

4. The welding assembly of claim 1, wherein the heat-resistant material comprises a non-metallic fibrous material.

5. The welding assembly of claim 1, wherein the heat-resistant material comprises a woven fiberglass strip that is attached to the tape substrate by way of stitching.

6. The welding assembly of claim 1, wherein the heat-resistant material comprises a root gap area arranged to span the welding root gap, and wherein the adhesive material is laterally offset from the root gap area.

7. The welding assembly of claim 6, wherein:
the heat-resistant material comprises first and second side edges on either side of the root gap area;
the adhesive material is disposed at first and second adhesive-bearing regions of the second tape substrate face;
the first adhesive region being located between the first side edge of the heat-resistant material and the first tape substrate side edge; and
the second adhesive region being located between the second side edge of the heat-resistant material and the second tape substrate side edge.

8. A welding method, comprising:
providing first and second workpiece structures to be welded together, the first and second workpiece structures being arranged in adjacent relationship to form a workpiece having welding root gap between the first and second workpiece structures;
the workpiece having a first side on which welding is to be performed and a second side opposite from the first side;
providing a rigid metal backing member facing the second side of the workpiece;
providing a heat-resistant weld backing tape disposed between the backing member and the second side of the workpiece;

the heat-resistant weld backing tape comprising:
a flexible metallic tape substrate arranged to cover the welding root gap;
the tape substrate having a longitudinal length that extends between first and second tape substrate ends;
the tape substrate having a lateral width that extends between first and second tape substrate side edges;
the tape substrate having a substantially planar first face facing the second side of the first and second structures and a substantially planar second face facing the backing member, each tape substrate face being bounded in a longitudinal direction by the first and second tape substrate ends and in a lateral direction by the first and second tape substrate side edges;
the first and second tape substrate faces being mutually parallel and spaced from each other by a tape substrate thickness;
the tape substrate length and the tape substrate width being substantially larger than the tape substrate thickness;
a heat-resistant material disposed on the first tape substrate face, the heat-resistant material being in interfacial contact with the second side of the first and second structures; and
an adhesive material disposed on the second tape substrate face, the adhesive material being adhered to the backing member;
welding the first and second workpiece structures together on the first side thereof; and
removing the backing member along with any residual portion of the weld backing tape that remains adhered to the backing member.

9. The welding method of claim 8, wherein the tape substrate comprises a flexible metallic foil material.

10. The welding method of claim 9, wherein the heat-resistant material comprises a flexible non-metallic material.

11. The welding method of claim 9, wherein the heat-resistant material comprises a non-metallic fibrous material.

12. The welding method of claim 9, wherein the heat-resistant material comprises a woven fiberglass strip that is attached to the tape substrate by way of stitching.

13. The welding method of claim 8, wherein the heat-resistant material comprises a root gap area arranged to span the welding root gap, and wherein the adhesive material is laterally offset from the root gap area.

14. The welding method of claim 13, wherein:
the heat-resistant material comprises first and second side edges on either side of the root gap area;
the adhesive material is disposed at first and second adhesive-bearing regions of the second tape substrate face;
the first adhesive region being located between the first side edge of the heat-resistant material and the first tape substrate side edge; and
the second adhesive region being located between the second side edge of the heat-resistant material and the second tape substrate side edge.

* * * * *